Oct. 9, 1951 G. C. PUSCHELBERG ET AL 2,571,059
BLOOD STRAINER
Filed June 5, 1947

INVENTORS.
GEORGE C. PUSCHELBERG.
WARREN B. COOKSEY.
BY
ATTORNEY.

Patented Oct. 9, 1951

2,571,059

UNITED STATES PATENT OFFICE 2,571,059

BLOOD STRAINER

George C. Puschelberg, Dearborn, and
Warren B. Cooksey, Detroit, Mich.

Application June 5, 1947, Serial No. 752,708

4 Claims. (Cl. 210—164)

Our invention relates to a new and useful improvement in a blood strainer adapted particularly for use in straining blood preceding or during the operation of transfusing blood into the veins of persons and animals, although, from the description given, it will appear obvious that the invention will also be adapted for other uses.

It is an object of this invention to provide an improved strainer having increased efficiency and capacity for straining predetermined sizes of particulate matter, gelatinous matter, solids, and semi-solids from fluids.

Heretofore a commonly used strainer consists of metal fabric. In a strainer of this type it is desirable that the structure be retained as light as possible, with the result that the size of the strainer must be kept within certain limits. Experience has shown that the metal fabric strainer frequently clogs with gelatinous matter. This gelatinous matter, which accumulates in blood which is strained when coming into contact with the surface area of a blood strainer, has a tendency to spread out and close a large section of the surface area of the strainer, which frequently results in a stoppage of the passage of the blood through the strainer. In view of the fact that it would be costly to provide folds or crevices in wire cloth strainers, it has not been practical to do this in order to increase the surface area of a blood filter with a predetermined diameter.

It is an object of the present invention to overcome these disadvantages and to provide other advantages.

It is another object of the invention to provide a blood strainer having a strainer element provided with folds or crevices so that a maximum straining area is provided for a given outside diameter.

Strainers commonly used heretofore were used repeatedly. This repeated use involves the costly operations of dipping the strainer in acid, thoroughly washing in the distilled water and autoclaving each time before they were reused. With the present invention a blood strainer is provided of sufficiently low cost so that it may be discarded after it has once been used.

Another object of the invention is the provision of a blood strainer which will function efficiently, after autoclaving, in a steam atmosphere having fifteen (15) pounds pressure at 250° F. With the strainers heretofore used the practice has developed, in order to prevent stoppage of the flow of strained blood through the strainers, to use a straining medium having openings large enough to permit the passage of particulate matter and gelatinous matter into the veins of the person, frequently causing harmful results to the person receiving the blood transfusion. The present invention will not have these disadvantages as the gelatinous matter and particulate matter which would be harmful to the person receiving the transfusion are prevented from passing through the strainer.

It is another object of the present invention to provide a blood strainer having at least one fluid-sealing gasket attached thereto and forming a composite part of the structure itself.

Another object of the invention is to provide a blood strainer comprising a liquid permeative strainer element and liquid drop indicating device whereby the rate of flow of liquid through the strainer may be indicated.

Other objects will appear hereinafter. It is recognized that various modifications and changes may be made in the detail of structure illustrated without departing from the invention itself and it is intended that such variations and modifications shall be encompassed within the scope of the claims which form a part hereof.

Figure 1:
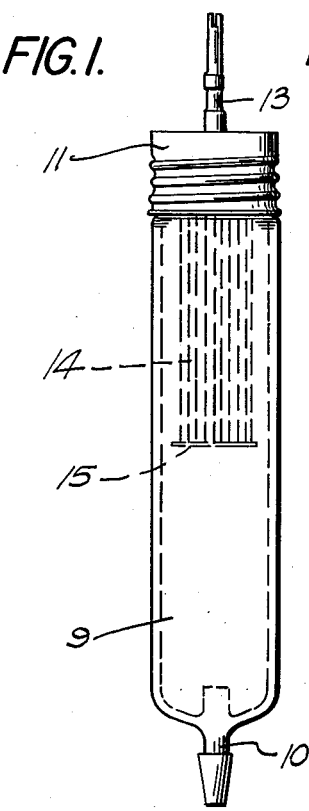
Fig. 1 is a side elevational view of a blood filter embodying the invention.

In the drawings we have shown a transparent receptacle or container 9 formed from glass or other suitable transparent material. Communicating with the interior of the receptacle 9 is a tube 10. One end of the receptacle 9 is open and threaded on its periphery to receive a cap 11 which is threaded thereon so as to press the gasket 12 against the end edges of the receptacle 9. Projecting through this cap 11 and through the gasket 12 is a tube 13.

The gasket 12 is attached to one end of the filter element 14. A disc 15 is attached to the opposite end of the filter element and serves as a closure therefor so that the filter element embodies, at one end, the sealing gasket 12 formed from cork, rubber or other suitable material. The structure is such that when the cap 11 is threaded on the gasket 12 an airproof connection between the interior of the receptacle 9 and the face of the gasket 12 is provided. It will be noted the gasket 12 does not enter the element 14.

Figure 4:
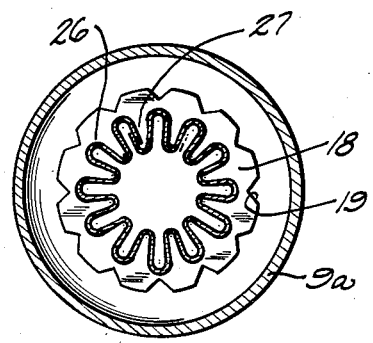
Fig. 4 is a sectional view slightly enlarged taken on line 4—4 of Fig. 3.

As clearly shown in Fig. 4, the filter element is fluted to provide a fluted periphery, these flutes extending from end to end of the filter element. By fluting the filter element in this manner a larger area of filter surface is provided than if the filter element were only a cylinder. This fluted periphery may be termed a structure in which the periphery is provided with folds extending between opposite ends.

The material used for forming the filter element is preferably a fabric impregnated with polymerized resin possessing stabilized qualities of thermosetting phenolic resin. By stabilized qualities of thermosetting phenolic resin is meant the thermo characteristics, the restrengthening or reinforcing characteristics, resistance to low moisture absorption and mild detergent solutions, heat sealing characteristics, and non-softening characteristics. The thermo characteristic desired in a polymerized resin of this class is a heat resistance at a temperature suitable for autoclaving sufficient to maintain stability of shape, form and size, so that there may be no excessive closing or clogging of the meshes. The strengthening or reinforcing qualities are those characteristics which will render the fabric, which is impregnated, sufficiently stiff and strong to retain its shape when removed from the forming and polymerizing mold. The low moisture absorption characteristics are those characteristics which will deter moisture absorption to the extent that undue swelling of the fabric strands cannot take effect sufficiently to close the mesh openings and the non-softening characteristics offset any breakdown during autoclaving temperatures up to 300° F. The fabric may be of any desired weave such as linen, cotton or the like and experience has shown that the most desirable weave used should be such as would have at least 5600 openings per square inch of surface area. Experience has shown that the openings should be at least .0005 inch in diameter and not greater than .006 inch in diameter.

It is also to be noted that the flutes or folds extend inwardly a greater distance than the space between the outer edges of adjacent folds. This is desirable in order to provide the increased straining area sought. With a strainer constructed in this manner and formed from the material specified, a highly efficient blood strainer is provided. Experience has shown that gelatinous and particulate matter will not be permitted to pass through the filters while, at the same time, a filter area which is unclogged and of sufficient size is always presented so that the desired flow of blood, including the red and white corpuscles, through the filter member for continuous transfusion is effected.

Figure 2:
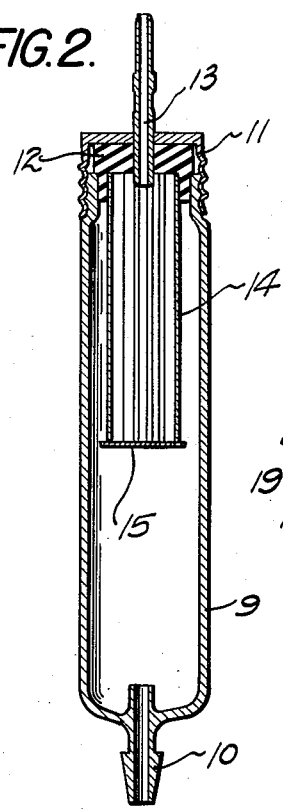
Fig. 2 is a longitudinal, central, sectional view of the invention shown in Fig. 1.

In the forms shown in Fig. 1 and Fig. 2, either the pipe 10 or the pipe 13 may be the inlet tube, depending upon whether the blood is to flow inwardly through the filter or outwardly through the filter.

Figure 3:
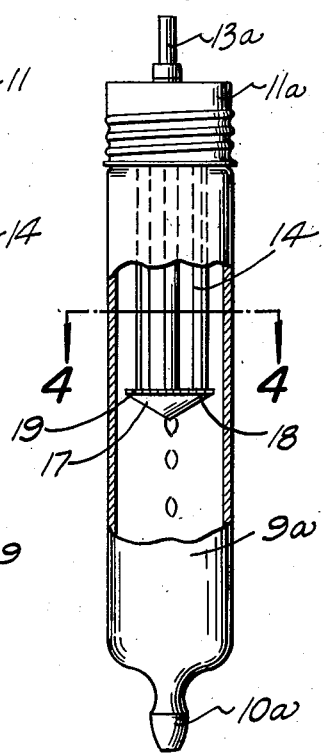
Fig. 3 is a side elevational view of a slight modification of the invention.

In Fig. 3 we have shown a slight modification of the invention. The filter element and the adjacent parts are similar. The receptacle 9a corresponds to the receptacle 9 and the tube 10a to the tube 10. The tube 13a is projected through the cap 11a in the manner shown in Fig. 2. The filter element 14 is as already described. Instead of the disc 15 we provide a closure 17 which has a flat upper surface 18 and conically formed below the flat upper surface. In other words, the closure 17 is in the nature of an inverted cone. Notches 19 may be formed in the periphery of the disc 17. When the blood is delivered inwardly through the pipe 13a and passes through the filters, it will flow downwardly on to the upper face 18 of the disc 17. It may then flow over the periphery of the disc 17 or over the notches 19, if the notches 19 have been formed in the disc. The blood will then flow down the conical surface to the surface shown, where it will gather in drops and fall off in drops. With this device constructed in this manner, the operator will always observe the rate of flow of the blood through the strainer as it will be indicated by the dropping off of the accumulated drops. This is an advantage as it indicates to the operator whether or not the strainer is functioning with the efficiency that is desired and allowing the proper amount of blood to pass through.

As shown in Fig. 4, an end 26 of the fabric is folded over the folded end 27 and these two ends are suitably cemented or pressed together so that an endless structure circumferentially is thus provided. This has proven a most effective way of joining adjacent ends together without interfering with the strainer area. It will be noted that these meeting edges overlap at least one full flute.

When the strainer element is formed from the material specified, the body will be quite stiff so that the flutes or corrugations or folds 26 are rigid and stiff. They are also capable of retaining this rigid, stiff formation even when in use, as the material will not become sufficiently saturated to cause the strainer to collapse or to substantially reduce the straining efficiency.

The fluting or corrugating of the periphery of the strainer element affords a structure in which a sort of prestraining is effected. The gelatinous matter will be caused to impinge on the convex faces of the flutes so that the side walls and the bottom of the channels between the flutes will remain free from this gelatinous matter to permit rapid passage of the blood therethrough.

What we claim as new is:

1. A straining device of the class described adapted for straining blood preceding and during the operation of transfusing blood into the veins of persons and animals, comprising: a hollow transparent receptacle open at one end and closed at its opposite end; a conducting tube projected through said closed end for conducting liquid into or out of said container; a strainer element projecting at one end into said container in spaced relation thereto and comprising a hollow elongated body unsupported intermediate its ends and having a plurality of circumferentially spaced, longitudinally directed flutes formed therein, said body being blood permeative and non-permeative as to particulate and gelatinous matter, said flutes being rounded at their inner and outer edges with the particulate and gelatinous matter adapted to bridge the spaces between the flutes and adapted to be supported by the rounded portions of the flutes, the rounded portions of the flutes being spaced apart a distance sufficient only to permit slight movement of the film at its unsupported portions into the spaces between the flutes with the film between the flutes being sufficiently thin and orificed by normal pressure of blood passing through the filter, an imperforate closure for the inner end of said strainer; and a closure for the outer end of said strainer of larger diameter than the inside diameter of said container and engaging the open end of said container and formed from compressible material.

2. A blood strainer of the class described adapted for straining blood preceding and during the operation of transfusing blood into the veins of persons and animals, comprising: a container closed at one end and open at its opposite end; a conducting tube passing through said closed end; a tubular shaped blood permeative strainer element unsupported intermediate its ends and formed of fabric impregnated with polymerized resin possessing stabilizing, thermosetting, reinforcing and non-softening characteristics in the presence of temperatures under 300° F. and being resistant to moisture adsorption and mild detergent solutions, similar to thermosetting phenolic resin, said element having circumferentially spaced apart longitudinally extending flutes between its ends, the opposite walls of each flute extending parallel and in planes substantially radial of the structure, said element being inserted in said container and spaced from the inner surface thereof, said flutes being rounded at their inner and outer edges with the particulate and gelatinous matter adapted to bridge the spaces between the flutes and adapted to be supported by the rounded portions of the flutes, the rounded portions of the flutes being spaced apart a distance sufficient only to permit slight movement of the film at its unsupported portions into the spaces between the flutes with the film between the flutes being sufficiently thin and orificed by normal pressure of blood passing through the filter.

3. A blood strainer of the class described adapted for straining blood preceding and during the operation of transfusing blood into the veins of persons and animals, comprising: a container closed at one end and open at its opposite end; a conducting tube passing through said closed end for conducting liquid into or out of the container; a tubular shaped blood permeative strainer element unsupported intermediate its ends and formed of fabric impregnated with polymerized resin possessing stabilizing, thermosetting, reinforcing and non-softening characteristics in the presence of temperatures under 300° F. and being resistant to moisture absorption and mild detergent solutions, similar to thermosetting phenolic resin, said element having circumferentially spaced apart longitudinally extending flutes between its ends, the opposite walls of each flute extending parallel and in planes substantially radial of the structure, said element being inserted in said container and spaced from the inner surface thereof, said flutes being rounded at their inner and outer edges with the particulate and gelatinous matter adapted to bridge the spaces between the flutes and adapted to be supported by the rounded portions of the flutes, the rounded portions of the flutes being spaced apart a distance sufficient only to permit slight movement of the film at its unsupported portions into the spaces between the flutes with the film between the flutes being sufficiently thin and orificed by normal pressure of blood passing through the filter, and an imperforate cone shaped closure for the inner end of said element tapering downwardly from said end of said element.

4. In a strainer for straining blood preceding and during a transfusing operation; a tubular shaped blood permeative strainer unsupported intermediate its ends and formed of fabric impregnated with polymerized resin possessing stabilizing, thermosetting, reinforcing and non-softening characteristics in the presence of temperatures under 300° F. and being resistant to moisture absorption and mild detergent solutions, similar to thermosetting phenolic resin, said strainer having circumferentially spaced-apart longitudinally extending flutes between its ends, said flutes being rounded at their inner and outer edges with the particulate and gelatinous matter adapted to bridge the spaces between the flutes and adapted to be supported by the rounded portions of the flutes, the rounded portions of the flutes being spaced apart a distance sufficient only to permit slight movement of the film at its unsupported portions into the spaces between the flutes with the film between the flutes being sufficiently thin and orificed by normal pressure of blood passing through the strainer, an imperforate closure for one end of said strainer and a perforated gasket of compressible material as a closure for the opposite end, said closures being permanently attached to said strainer.

GEORGE C. PUSCHELBERG.
WARREN B. COOKSEY.

REFERENCES CITED

The following references are of record in the file of this patent:

UNITED STATES PATENTS

| Number | Name | Date |
| --- | --- | --- |
| 847,537 | Abbott | Mar. 19, 1907 |
| 2,186,987 | Nesset | Jan. 16, 1940 |
| 2,212,318 | Gee | Aug. 20, 1940 |
| 2,235,178 | Sutherland | Mar. 18, 1941 |
| 2,239,868 | Williams | Apr. 29, 1941 |
| 2,315,109 | Cutter | Mar. 30, 1943 |